UNITED STATES PATENT OFFICE.

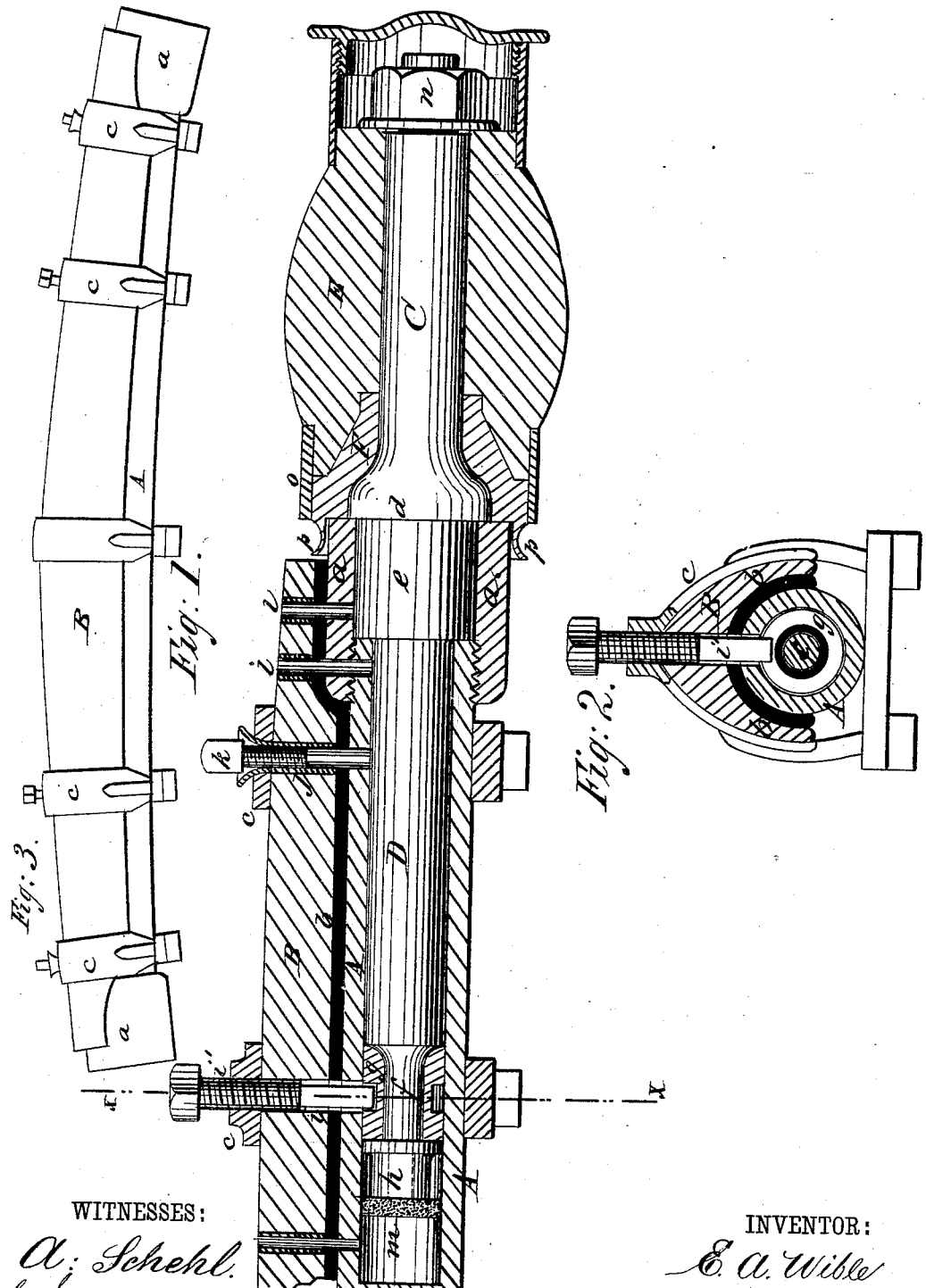

ELIAS A. WIBLE, OF FOLSOM, CALIFORNIA, ASSIGNOR TO HIMSELF AND BENJAMIN N. BUGBEY, OF SAME PLACE.

IMPROVEMENT IN VEHICLE-AXLES.

Specification forming part of Letters Patent No. 223,203, dated December 30, 1879; application filed July 21, 1879.

*To all whom it may concern:*

Be it known that I, ELIAS A. WIBLE, of Folsom, in the county of Sacramento and State of California, have invented a new and Improved Axle and Spindle, of which the following is a specification.

The invention consists in an axle formed of a socketed tube and a wooden stock, in combination with an interposed layer of rubber; also, in a hole leading through axle to the shaft, and provided with a case, a cup, and a screw, in combination with the tubular part of the axle, the spindle-shaft, and air-holes leading through the axle, as hereinafter fully described.

In the accompanying drawings, Figure 1 is a longitudinal section of my improvement. Fig. 2 is a cross-section of the same on line $x$ $x$, and Fig. 3 is a side elevation of the improvement.

Similar letters of reference indicate corresponding parts.

Referring to the drawings, A is the hollow tubular part of the axle, curved or arched evenly to the middle sufficiently to enable the spindles when inserted to give the proper set to the wheels. The tube may also be sprung back sufficiently to give the requisite gather to the wheels. On the ends of this tube are rings or sockets $a$, screwed or welded to form boxes for the reception of the outer bearing of the spindle-shaft.

B is the wooden stock laid on top of the tube and over the boxes at the ends. Between is a sheet of rubber, $b$, forming a cushion, that relieves the axle and spindle of the jars caused by the wheels striking obstructions. The tube-stock and rubber are secured together by ordinary clips $c$.

C represents the spindles, terminating on their inner ends with shoulders $d$. The spindles have projecting from their shoulders shafts D, on the ends whereof adjacent to shoulders $d$ are enlarged portions $e$, forming gudgeons or bearings, which fit snugly within the boxes formed by the sockets $a$ and bear against the ends of the axle or tube A.

The extremities of shafts D are reduced to form a second bearing, $f$, over which is placed a sleeve or cylindrical box, $g$, which is held on the bearing by a collar, $h$, passed over the projecting end by riveting the end, or by a screw-nut, or in any other suitable manner that will allow the bearing perfect freedom to turn in the box. The box $g$ fits closely in the tubular axle, and is in such a position on the shaft that when the latter is inserted in the axle an annular groove in the box falls under a hole, $i$, made through the clip, wooden stock, rubber, and tubular axle, in which is screwed a bolt or set-screw, $i'$, the lower end whereof, forming a key, projects into the annular groove in the box when screwed in, and thus secures the shaft and spindle to the axle in a way that allows the shaft and spindle to revolve freely, the set-screw serving at the same time to draw the clip upward, thereby holding it firmly in place and binding the parts securely together.

A hole, $j$, is made through the end clip, $c$, the wooden stock, rubber, and tube, and in this hole is inserted a tube, and at the upper end a small cup, and a small screw-plug, $k$, is fitted into the hole. Through this hole the oil or other fluid lubricant is passed into the axle for lubricating the spindle-shaft, other holes, $l\ l$, serving as air-holes, to permit the escape of air when the lubricant is poured in.

Beyond the box $g$ a small space is divided off by a partition on one side and packing next to the end of the shaft, forming thus a lubricant-box, $m$, with a tube leading up through the axle and stock. Sufficient lubricating material can be placed in this box to last several days.

Owing to the bend which is given to the axle the lubricant gravitates down toward the end, both that placed in the box and that entered through the hole $j$, whereby the bearings of the shaft are kept thoroughly lubricated.

E is the hub, placed over spindle C and secured by a flanged nut, $n$, on the projecting end of the spindle. In the inner end of the hub is inserted a conical flanged thimble, F, the inside bore of which is adapted to fit closely over the enlarged end of the spindle next to the shoulder $d$, while the flange of the thimble abuts against the end of the hub and is held under the collar $o$, while from the flange projects a shield, $p$, which passes over the box close up against the end of the wooden stock. This prevents mud from splashing in between the box and hub, and also gives a neat finish to this part of the axle and spindle.

The advantages of this invention are many. In the first place, the friction is greatly reduced, owing to the small extent of bearing-surface given the shaft, this being limited to bearings $e$ and $f$. Again, a self-lubricating spindle is supplied without weakening it, as is apt to be the case where the spindle is hollow. Again, great strength is given to the spindle and axle by the manner in which the spindle is entered in the axle the length of the shaft, and the firm bearings with which it is furnished preventing it from yielding to the shocks and jars of the wheels coming in contact with stumps, stones, and other obstructions. The spindle is very easily removed when necessary on account of breakage, or for other reasons. One bolt, $i'$, only is requisite to hold it in the axle, and on loosening this the wheel, spindle, and shaft are immediately disconnected from the axle. Lastly, the lubricating arrangements give this invention a decided superiority over the devices now in use for the same purpose.

Having thus described my invention, I claim as new and desire to secure by Letters Patent—

1. As an improvement in wagon axles and spindles, the axle formed of the tube A, provided with sockets $a$ on the ends to form boxes for the bearings of the spindle-shafts, and curved or arched to the center to give the proper set to the wheels, and the wooden stock B, combined with the interposed sheet or layer of rubber $b$, to form a cushion, the said parts being secured together by clips $c$, substantially as described.

2. The combination of the grooved sleeve, set-screw, clip having cross-bar, and tubular axle, as shown and described, whereby the set-screw works in a groove of sleeve and serves the double purpose of holding the sleeve to the axle and drawing upward on the clip.

ELIAS ALEXANDER WIBLE.

Witnesses:
   J. H. SMITH,
   J. H. BURNHAM.